April 24, 1962 K. SCHOPF 3,031,164
SHOCK ABSORBING ARRANGEMENT FOR TRACTOR SEATS AND THE LIKE
Filed Jan. 19, 1961 2 Sheets-Sheet 1

INVENTOR:
KARL SCHOPF
BY
his ATTORNEY

April 24, 1962  K. SCHOPF  3,031,164
SHOCK ABSORBING ARRANGEMENT FOR TRACTOR SEATS AND THE LIKE
Filed Jan. 19, 1961  2 Sheets-Sheet 2
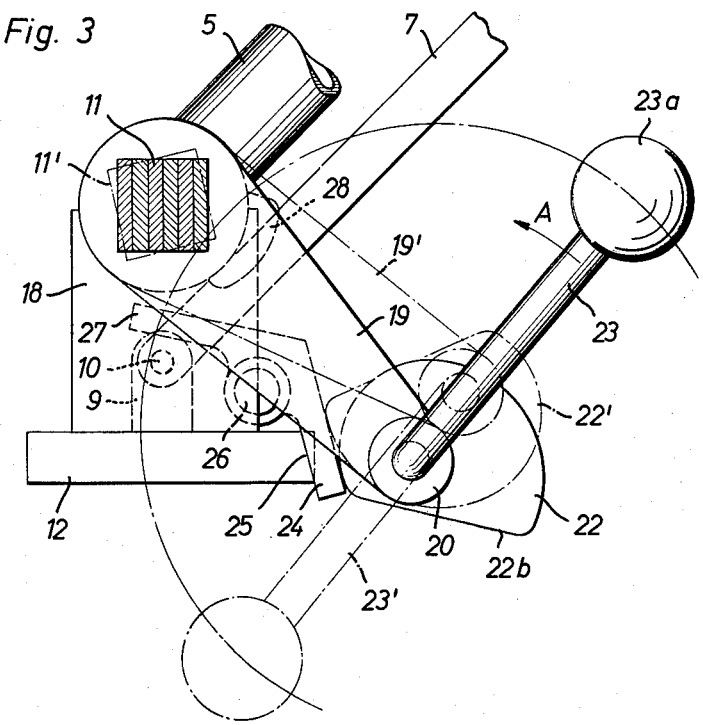
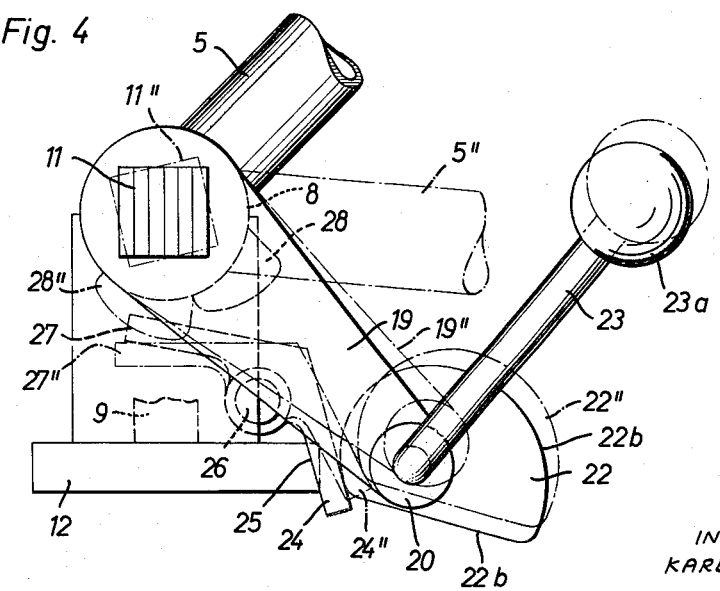
INVENTOR:
KARL SCHOPF
BY
Michael S. Striker
his ATTORNEY

United States Patent Office

3,031,164
Patented Apr. 24, 1962

3,031,164
SHOCK ABSORBING ARRANGEMENT FOR
TRACTOR SEATS AND THE LIKE
Karl Schopf, Grosshelfendorf, near Munich, Germany, assignor to Georg Fritzmeier, K.G., Grosshelfendorf, near Munich, Germany
Filed Jan. 19, 1961, Ser. No. 83,758
Claims priority, application Germany Jan. 21, 1960
17 Claims. (Cl. 248—373)

The present invention relates to a mechanical shock absorbing arrangement for cushioning the movements of a load, and more particularly to a shock absorbing arrangement which is especially suited for cushioning the driver's seat in a tractor or another automotive vehicle. It is already known to support the seat of a tractor or another conveyance by resilient means whose tension and resistance to the descent of the seat under the weight of the driver's body increase proportionally with deflection of the seat from its normal position. A serious drawback of such prior arrangements is that the tension of the resilient means cannot be adjusted at will and that the means for adjusting the tension is not readily accessible to the driver when the conveyance is in motion.

Accordingly, it is an important object of the present invention to provide a shock absorbing arrangement for the seat of an automotive vehicle which is constructed and assembled in such a way that it may be rapidly and conveniently adjusted by a person occupying the seat, which is of very simple and rugged construction, which is reliable in operation, and which is capable of providing an infinite number of adjustments such as will bring about optimum cushioning effect necessary to meet the conditions of the terrain on which the vehicle travels.

Another object of the invention is to provide a shock absorbing arrangement of the just outlined characteristics which is adjustable by hand or in a fully automatic way so as to insure that the person occupying the seat is not subjected to a sudden shock such as could cause said person to lose control of the vehicle or to be uncomfortable in the seat.

A further object of the instant invention is to provide a shock absorbing arrangement of the above described type which may be readily installed in many types of automotive vehicles, which is of very compact and hence space-saving design, which can be adjusted in a very simple way, and which is capable of withstanding very high stresses such as may arise when the vehicle travels on rough terrain or when the resilient component of the shock absorbing arrangement is subjected to very high loads.

With the above objects in view, the invention resides in the provision of a mechanical shock absorbing arrangement which, in its elementary form, comprises elongated biasing means preferably assuming the form of a package consisting of a plurality of ribbon torsion springs, load transmitting means connected with the seat of a tractor or another load supporting means and with one end portion of the biasing means, and tension adjusting means preferably comprising a tensioning lever connected with the other end portion of the biasing means. This lever may be pivoted manually, by remote control or, in accordance with an important feature of my invention, in a fully automatic way in dependency on the movement of the load from its normal position, so as to increase the tension of the biasing means and to counteract with a greater force or to fully prevent further deflection of the load.

Certain other features of the invention reside in the provision of a specific manually operable pivoting and adjusting mechanism for the tensioning member, in the provision of a specially constructed parallel motion system which directly supports the load, in the specific construction of the automatic adjusting mechanism for the tensioning member, and in the specific mounting of the biasing means so that this biasing means may be subjected to an increased tension by selectively twisting either one of its end portions with respect to the other end portion.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

Figures 1, 2:
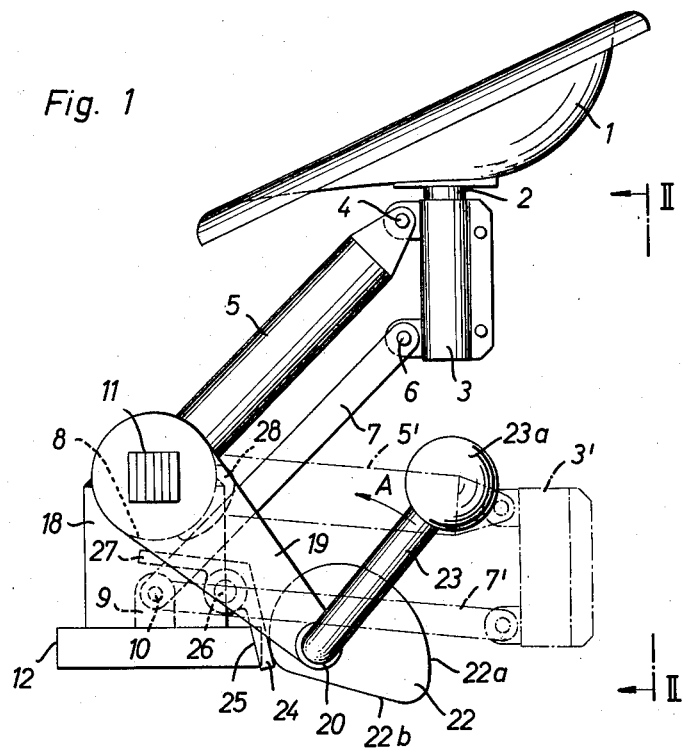
FIG. 1 is a side elevational view of the mechanical shock absorbing arrangement as utilized for cushioning a load in the form of a seat for a tractor or a like conveyance, the parallel motion system which directly supports the seat being shown in two different positions respectively indicated in full and phantom lines.
FIG. 2 is an end elevational view of the shock absorbing arrangement as seen in the direction of arrows from the line II—II of FIG. 1, certain parts being partially broken away for the sake of clarity.

FIG. 3 is an enlarged fragmentary side elevational view of the manual adjusting mechanism which forms a component part of the shock absorbing arrangement, a different position of this adjusting mechanism being shown in phantom lines; and FIG. 4 is an enlarged fragmentary side elevational view of the manual adjusting mechanism in the position it assumes prior to the actuation of the automatic adjusting mechanism, the changed position of the manual and automatic adjusting mechanisms being shown in phantom lines.

Referring now in greater detail to the drawings, and first to FIG. 1, there is shown a mechanical shock absorbing arrangement for a load in the form of a tractor seat 1, the arrangement comprising a parallel motion system including a vertical clamp 3 which adjustably receives the downwardly extending vertical shaft 2 of the seat 1 a first link 5 whose upper end is connected to the clamp 3 by a pivot pin 4, a second link 7 whose upper end is connected to the clamp 3 by a second pivot pin 6 located at a level below the pin 4, and means defining two parallel pivot axes for the lower ends of the links 5 and 7. The link 5 actually supports the seat 1, and the lower link 7 serves as a means for maintaining the shaft 2 in vertical position. The parallel motion system is carried by supporting means in the form of a base plate 12 which constitutes a component part of the tractor frame and carries a lug or bracket 9 which pivotally supports the lower end of the link 7 by means of a pin 10, the axis of this pin constituting the pivot axis for the lower end of the link 7. The lower end of the link 5 is welded or otherwise rigidly secured to and extends radially from a rotary member in the form of a horizontal tube 8, best shown in FIG. 2, the reinforced right-hand end 8a of this tube being rotatably received in a bearing bracket 13 which is connected to the base plate 12 by one or more bolts 13a. The other end 8b of the tube 8 rotatably receives the boss 14 provided at one end of a tensioning member in the form of a one-armed lever 19, the boss 14 being also rotatable in a bearing bracket 18 which is welded to the base plate 12. Thus, the common axis of the tube 8, of the bearing brackets 13, 18 and of the boss 14 constitutes the pivot axis for the lower end of the link 5.

The right-hand end 8a of the tube 8 is formed with a non-circular (e.g. rectangular) bore 15 which receives the right-hand end portion 11a of a biasing means in the form of a laminated package 11 composed of a number of ribbon torsion springs. The end portion 11a is thus directly connected with the parallel motion system and takes up the entire load carried by and including the seat 1. The tube 8 constitutes a means for transmitting the load to the end portion 11a of the biasing means. The other end portion 11b of the biasing means 11 is received in the non-circular bore 17 formed in the boss 14 of the lever 19. A headless radial screw 16 extends into the bore 15 and prevents axial displacements of the biasing means 11 with respect to the tube 8.

The biasing means 11 tends to maintain the seat 1 in the position of FIG. 1 by forcing the tube 8 to assume an angular position corresponding to a fully untwisted position of the ribbon torsion springs which together form the biasing means 11, i.e. the springs are disposed in parallel planes if the tube 8 is free to follow the bias of the package 11. In the end position of the seat 1 as shown in FIG. 1, the link 7 abuts against the tube 8 and thus prevents further anticlockwise movement of the link 5 about the axis of the rotary tube 8. In other words, the link 7 actually constitutes a stop for the pivotal movement of the link 5 in one (anticlockwise) direction. Such a stop is necessary in order to insure that the seat 1 does not change its position when the driver desires to increase the tension of the biasing means 11. The bias of the ribbon torsion springs constituting the biasing means 11 may be increased by a manually actuatable cam lever 23 which is pivotally connected to the free end of the tensioning lever 19 and carries a shaft 21 which is connected to an eccentric cam follower 22 whose arcuate face 22a engages with a flat cam 24. The shaft 21 is rotatably received in a bearing sleeve 20 which is connected to the free end of the lever 19. The configuration of the arcuate cam face 22a is such that the follower 22 causes an anticlockwise pivotal movement of the tensioning lever 19 when the cam lever 23 is swung by hand or by remote control in anticlockwise direction indicated by the arrow A. This causes a twisting and resultant tensioning of the biasing means 11 in a direction to urge the link 7 with a greater force against the tube 8 so that a greater force is necessary to cause a descent of the seat 1 to a position in which the clamp 3, the link 5 and the link 7 respectively assume the phantom-line positions indicated by reference numerals 3', 5' and 7'. The flat plate cam 24 normally abuts against the end face 25 of the base plate 12. The means for manually pivoting the cam lever 23 from the position of FIG. 1 in the direction of the arrow A comprises a handgrip member in the form of a knob 23a which is preferably within reach of the driver's hand. Of course, it will be readily understood that the cam lever 23 may be pivoted by a remote control mechanism of any suitable design, e.g. by a link train, particularly in the event that this lever is rather distant from the seat 1.

When the load upon the end portion 11a is reduced, i.e. when the driver rises from the seat 1, the parallel motion system including the clamp 3 and the links 5, 7 immediately returns to the full-line position of FIG. 1 under the action of the biasing means 11 which tends to rotate the tube 8 until the latter comes into abutment with the link 7. By adjusting the angular position of the tensioning lever 19, the driver can adjust the cushioning effect of the shock absorbing arrangement because any angular displacements of the lever 23 in anticlockwise direction (arrow A) will reduce the cushioning action so that the seat 1 is not likely to vibrate when the tractor travels on slightly uneven terrain but the seat will descend in response to substantial shocks such as could be unpleasant to the driver.

FIG. 3 shows the manually adjustable cam lever 23 in the end position of FIG. 1 (full lines) as well as in a phantom-line second end position 23' assumed by this lever when the biasing means 11 is under maximum initial tension. It will be noted that the tensioning lever 19 then also pivots in anticlockwise direction to assume the phantom-line position 19' and to twist the biasing means 11 to the position 11'. In such position 11' of the biasing means 11, the load including the seat 1 must be increased substantially in order to cause a pivotal movement of the links 5 and 7 in clockwise direction. The driver operates the cam lever 23 when he desires to adjust the tension of the biasing means 11 to his own weight or to change the tension while the conveyance moves from uneven onto smoother terrain, or vice versa. Of course, the lever 23 may assume any desired number of intermediate positions to move the shaft 21 to a given position with respect to the cam 24 and to thereby bring about corresponding angular displacements of the tensioning lever 19. As mentioned hereinabove, the link 7 may come into abutment with the tube 8 so as to prevent a raising of the seat 1 when the driver pivots the cam lever 23 in anticlockwise direction in order to increase the tension of the biasing means 11.

FIG. 4 illustrates in greater detail an automatic pivoting mechanism for the lever 19 for adjusting the tension of the biasing means 11 which becomes operative in response to a predetermined initial load upon the end portion 11a, i.e. in response to a predetermined rotary movement of the tube 8 and of the link 5 in clockwise direction, as viewed in FIG. 4. Such rotary movement of the tube 8 causes a twisting of the end portion 11a with respect to the end portion 11b in a sense to increase the tension of the biasing means. As shown, the plate cam 24 forms one arm of a rockable bell crank lever whose other arm 27 is in the path of and is rockable by a projection 28 carried by the tube 8 so that, when the tube 8 rotates in clockwise direction to an extent necessary to move the link 5 to the phantom-line position 5", the projection 28 engages the arm 27 and rocks the bell crank lever 24, 27 about a pivot pin 26 which, as shown in FIG. 2, is connected to the bearing bracket 18. As soon as the projection 28 assumes the position 28" and engages the arm 27 to deflect the latter to the position 27", the arm 24 assumes the position 24" and causes the tensioning lever 19 to assume the position 19" without requiring any angular displacement of the manually operable cam lever 23, i.e. without requiring any actuation of the pivoting means 22—24 for the lever 19. The lever 23 then moves in parallelism with itself and assumes a position corresponding to the phantom-line position 22" of the cam follower 22. The pivotal movement of the tensioning lever 19 (to the position 19") increases the tension of the biasing means 11 (see the position 11") so that the latter resists with a greater force the descent of the link 5 beyond the position 5". In other words, the shock absorbing arrangement now counteracts with a greater force the load carried by and including the seat 1 to prevent a strong impact of the link 7 against the base plate 12 or an excessive lowering of the seat 1 such as would be uncomfortable to the driver when the manual adjusting mechanism is in a position as shown in full lines in FIG. 3.

As soon as the downwardly acting force upon the seat 1 is reduced, the link 5 begins to pivot in anticlockwise direction so that the projection 28 moves away from the arm 27 and the automatic bias or tension adjusting mechanism 27, 28 is inactivated, ie. the tension of the biasing means 11 is reduced when the seat 1 moves toward its normal position of FIG. 1.

Of course, the cam face 22a of the follower 22 need not necessarily assume an arcuate (convex) shape but may be of polygonal or other contour as long as it insures that the tension of the biasing means 11 increases by a twisting of the end portion 11b with respect to the end portion 11a when the tensioning lever 19 is pivoted in a given direction (arrow A). The other face 22b of the cam follower 22 is but need not always be flat. This face 22b does not move into contact with the plate cam 24.

The automatic tension adjusting mechanism 27, 28 for the biasing means 11 actually constitutes a releasable coupling for adjusting the tensioning lever 19 and for thereby changing the relative position of the cam and follower assembly 22, 24 in a sense to further increase the tension of the biasing means 11 without changing the position of the cam lever 23. In other words, the manually operable adjusting mechanism including the tensioning lever 19 and its pivoting means acts against and is adapted to twist the end portion 11b of the biasing means 11 with respect to the end portion 11a, while the automatic adjusting mechanism 27, 28 responds to a predetermined movement of the load transmitting means, i.e., to a predetermined twisting of the end portion 11a with respect to the end portion 11b because the end portion 11a is connected with the tube 8 which constitutes the load transmitting means and rocks the arm 27 through the projection 28.

It will be noted that the projection 28 widens gradually in a direction radially away from the periphery of the rotary tube 8 so that the automatic tensioning of the biasing means 11 increases proportionally with the extent to which the seat 1 descends from its normal position. Such configuration of the projection 28 insures that the resistance of the biasing means 11 increases gradually and reaches its maximum magnitude when the angular displacement of the links 5 and 7 reaches an undesirable or even dangerous value, i.e. a value at which the means which supports the seat 1 or the seat itself is likely to hit against an obstruction such as could impart a shock to the driver. However, since the projection 28 is normally at least slightly spaced from the arm 27, the seat 1 is free to vibrate in response to lesser shocks without causing a change in the tension of the biasing means 11. This is advisable because a softly cushioned seat is more comfortable to the driver in normal operation of the conveyance, namely, when the surface on which the conveyance travels is reasonably smooth.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention, and, therefore, such adaptations should and are intended to be comprehended within the meaning and range of equivalence of the following claims.

What is claimed as new and desired to be secured by Letters Patent is:

1. A shock absorbing arrangement for cushioning the movements of a load, said arrangement comprising, in combination, elongated biasing means of the torsion spring type, said biasing means having a first and a second end portion; load transmitting means connected with one of said end portions; first tension adjusting means comprising a tensioning member connected with the other end portion and adapted to twist said other end portion with respect to said one end portion for increasing the tension of said biasing means; and second tension adjusting means responsive to the twisting of said one end portion with respect to said other end portion in a direction to increase the tension of said biasing means, said second tension adjusting means comprising means for adjusting said tensioning member so as to further increase the tension of said biasing means in response to the twisting of said one end portion with respect to said other end portion.

2. A shock absorbing arrangement for cushioning the movements of a load, said arrangement comprising, in combination, elongated biasing means of the torsion spring type, said biasing means having a first and a second end portion; load transmitting means connected with one of said end portions; first tension adjusting means comprising a tensioning member connected with the other end portion and adapted to twist said other end portion with respect to said one end portion for increasing the tension of said biasing means; and second tension adjusting means responsive to a predetermined twisting of said one end portion with respect to said other end portion in a direction to increase the tension of said biasing means, said second tension adjusting means comprising means for adjusting said tensioning member so as to further increase the tension of said biasing means in response to said predetermined twisting of said one end portion with respect to said other end portion.

3. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said rotary member in a direction to twist said one end portion with respect to said other end portion and to thereby increase the tension of said biasing means, said second adjusting means comprising means operatively connected with said pivoting means for adjusting said tensioning member so as to further increase the tension of said biasing means in response to said predetermined rotary movement of said rotary member.

4. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said rotary member in a direction to twist said one end portion with respect to said other end portion and to thereby increase the tension of said biasing means, said second adjusting means consisting of a projection connected with said rotary member and a rockable arm located in the path of said projection and operatively connected with said pivoting means for adjusting said tensioning member so as to further increase the tension of said biasing means when engaged and rocked by said projection in response to said predetermined rotary movement of said rotary member.

5. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and pivoting means operatively connected with said tensioning member for pivoting the same in directions to twist and untwist said other end portion with respect to said one end portion to thereby respectively increase and reduce the tension of said biasing means, said pivoting means comprising a cam lever rotatably connected with said tensioning member, a cam follower connected to and rotatable with said lever, a rockable first arm cooperating with said follower for pivoting said tensioning member in response to rotation of said cam lever, and abutment means for said first arm; and a second tension adjusting means responsive to a predetermined rotary movement of said rotary member in a direction to twist said one end portion with respect to said other end portion and to thereby increase the tension of said biasing means, said second adjusting means comprising a projection connected to and rotatable with said rotary member, and a second arm connected with said first arm for rocking said first arm and for thereby adjusting said tensioning member so as to further increase the tension of said biasing means when engaged and rocked by said projection in response to said predetermined rotary movement of said rotary member.

6. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means, said pivoting means comprising a cam lever rotatably connected with said tensioning member, a cam follower connected to and rotatable with said lever, a rockable first arm cooperating with said follower for pivoting said tensioning member in response to rotation of said cam lever, and abutment means for said first arm; and second tension adjusting means responsive to a predetermined rotary movement of said rotary member in a direction to twist said one end portion with respect to said other end portion and to thereby increase the tension of said biasing means, said second adjusting means comprising a projection connected to and rotatable with said rotary member, and a second arm connected with said first arm for rocking said first arm and for thereby adjusting said tensioning member so as to further increase the tension of said biasing means when engaged and rocked by said projection in response to said predetermined rotary movement of said rotary member, said arms together constituting a bell crank lever.

7. A mechanical shock absorbing arrangement for cushioning the movements of a load, said arrangement comprising, in combination, elongated biasing means of the ribbon torsion spring type, said biasing means having a first and a second end portion; load transmitting means comprising a rotary tube at least partially receiving said biasing means and non-rotatably connected with one of said end portions; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said tube in a direction to twist said one end portion with respect to said other end portion and to thereby increase the tension of said biasing means, said second adjusting means comprising a projection connected with said tube and a rockable arm located in the path of said projection and operatively connected with said pivoting means for adjusting said tensioning member so as to further increase the tension of said biasing means when rocked by said projection in response to said predetermined rotary movement of said tube.

8. A shock absorbing arrangement for cushioning the movements of a seat for tractors and the like, said arrangement comprising, in combination, elongated biasing means of the ribbon torsion spring type, said biasing means having a first and a second end portion; load transmitting means comprising a rotary tube at least partially receiving said biasing means and non-rotatably connected with one of said end portions, and seat-supporting link means rigidly connected with said tube; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said tube in a direction to twist said one end portion with respect to said other end portion and to thereby increase the tension of said biasing means, said second adjusting means comprising a projection connected with said tube and a rockable arm located in the path of said projection and operatively connected with said pivoting means for adjusting said tensioning member so as to further increase the tension of said biasing means when rocked by said projection in response to said predetermined rotary movement of said tube.

9. A shock absorbing arrangement for cushioning the movements of a seat for tractors and the like, said arrangement comprising, in combination, elongated biasing means of the ribbon torsion spring type, said biasing means having a first and a second end portion; load transmitting means comprising a rotary tube at least partially receiving said biasing means and non-rotatably connected with one of said end portions, and a seat-supporting parallel motion system including link means rigidly connected with said tube; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said tube in a direction to twist said one end portion with respect to said other end portion and to thereby increase the tension of said biasing means, said second adjusting means comprising a projection connected with said tube and a rockable arm located in the path of said projection and operatively connected with said pivoting means for adjusting said tensioning member so as to further increase the tension of said biasing means when rocked by said projection in response to said predetermined rotary movement of said tube.

10. A shock absorbing arrangement for cushioning the movements of a seat for tractors and the like, said arrangement comprising, in combination, elongated biasing means of the ribbon torsion spring type, said biasing means having a first and a second end portion; load transmitting means comprising a rotary tube at least partially receiving said biasing means and non-rotatably connected with one of said end portions, and a parallel motion system including seat-supporting first link means rigidly connected with said tube and second link means adapted to abut against said tube to limit the rotary movement of said tube in one direction; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said tube in a direction counter to said one direction so as to twist said one end portion with respect to said other end portion and to thereby increase the tension of said biasing means, said second adjusting means comprising a projection connected with said tube and a rockable arm located in the path of said projection and operatively connected with said pivoting means for adjusting said tensioning member so as to further increase the tension of said biasing means when rocked by said projection in response to said predetermined rotary movement of said tube.

11. A mechanical shock absorbing arrangement for cushioning the movements of a load, such as the seat of a conveyance or the like, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and located within reach of the load, and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said rotary member in a direction to twist said one end portion with respect to said other end portion and to thereby increase the tension of said biasing means, said second adjusting means comprising means operatively connected with said pivoting means for adjusting said tensioning member so as to further increase the tension of said biasing means in response to said predetermined rotary movement of said rotary member.

12. A shock absorbing arrangement for cushioning the movements of a load, such as the seat of a tractor or the like, said arrangement comprising, in combination, supporting means; a substantially horizontal load transmitting tube rotatably mounted on said supporting means; elongated biasing means at least partially received in said tube and having a first and a second end portion, one of said end portions non-rotatably connected with said tube; first tension adjusting means comprising a pivotable tensioning lever connected to the other end portion and pivoting means operatively connected with said lever for pivoting the same in directions to twist and untwist said other end portion with respect to said one end portion and to thereby respectively increase and reduce the tension of said biasing means; and second tension adjusting means responsive to a predetermined rotary movement of said tube in a direction to twist said one end portion with respect to said other end portion and to thereby increase the tension of said biasing means, said second adjusting means comprising coupling means operatively connected with said tube and with said pivoting means for pivoting said lever so as to further increase the tension of said biasing means in response to said predetermined rotary movement of said tube.

13. A shock absorbing arrangement for cushioning the movements of a load, such as the seat of a tractor or the like, said arrangement comprising, in combination, supporting means; a substantially horizontal load transmitting tube rotatably mounted on said supporting means; elongated biasing means at least partially received in said tube and having a first and a second end portion, said biasing means consisting of a laminated package including a plurality of ribbon torsion springs, one of said end portions non-rotatably connected with said tube; first tension adjusting means comprising a pivotable tensioning lever connected to the other end portion and pivoting means operatively connected with said lever for pivoting the same in directions to twist and untwist said other end portion with respect to said one end portion and to thereby respectively increase and reduce the tension of said biasing means; and second tension adjusting means responsive to a predetermined rotary movement of said tube in a direction to twist said one end portion with respect to said other end portion and to thereby increase the tension of said biasing means, said second adjusting means comprising coupling means operatively connected with said tube and with said pivoting means for pivoting said lever so as to further increase the tension of said biasing means in response to said predetermined rotary movement of said tube.

14. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a rotary movement of said rotary member in a given direction to twist said one end portion with respect to said other end portion and to thereby increase the tension of said biasing means, said second adjusting means comprising means operatively connected with said pivoting means for gradually adjusting said tensioning member so as to progressively increase the tension of said biasing means when said rotary member rotates in said given direction.

15. A shock absorbing arrangement for cushioning the movements of a load, said arrangement comprising, in combination, elongated biasing means having a first and a second end portion; load transmitting means connected with one of said end portions; and tension adjusting means connected with the other end portion, said tension adjusting means comprising a pivotable tensioning lever non-rotatably secured to said other end portion and pivoting means for said lever including a cam and follower assembly and a cam lever for operating said assembly.

16. A mechanical shock absorbing arrangement for cushioning the movements of a load, said arrangement comprising, in combination, elongated biasing means of the ribbon torsion spring type, said biasing means having a first and a second end portion; load transmitting means comprising a rotary member connected with one of said end portions; first tension adjusting means comprising a pivotable tensioning member having a boss non-rotatably connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to a predetermined rotary movement of said rotary member in a direction to twist said one end portion with respect to said other end portion and to thereby increase the tension of said biasing means, said second adjusting means comprising means operatively connected with said pivoting means for adjusting said tensioning member so as to further increase the tension of said biasing means in response to said predetermined rotary movement of said rotary member.

17. A shock absorbing arrangement for cushioning the movements of a seat for tractors and the like, said arrangement comprising, in combination, elongated biasing means of the ribbon torsion spring type, said biasing means having a first and a second end portion; load transmitting means comprising a rotary tube at least partially receiving said biasing means and non-rotatably connected with one of said end portions, and seat-supporting link means rigidly connected with said tube; first tension adjusting means comprising a pivotable tensioning member connected with the other end portion and pivoting means operatively connected with said tensioning member for pivoting the same in directions to twist and untwist said other end portion with respect to said one end portion and to thereby respectively increase and reduce the tension of said biasing means; and second tension adjusting means responsive to the rotary movement of said tube in a direction to twist said one end portion with respect to said other end portion and to thereby increase the tension of said biasing means, said second adjusting means comprising a projection connected with said tube and a rockable arm located in the path of said projection and operatively connected with said pivoting means for adjusting said tensioning member so as to gradually increase the tension of said biasing means when rocked by said projection in response to the rotary movement of said tube.

References Cited in the file of this patent

UNITED STATES PATENTS

| | | |
|---|---|---|
| 1,416,942 | Brooks | May 23, 1922 |
| 2,760,553 | Lie | Aug. 28, 1956 |
| 2,778,626 | Klepp | Jan. 22, 1957 |
| 2,845,991 | Soderberg | Aug. 5, 1958 |
| 2,985,227 | Leja | May 23, 1961 |

FOREIGN PATENTS

| | | |
|---|---|---|
| 935,338 | Germany | Nov. 17, 1955 |